June 29, 1937.  D. M. HAMMETT  2,085,360
PUMP VALVE CONSTRUCTION
Filed July 9, 1935
Fig. 1.
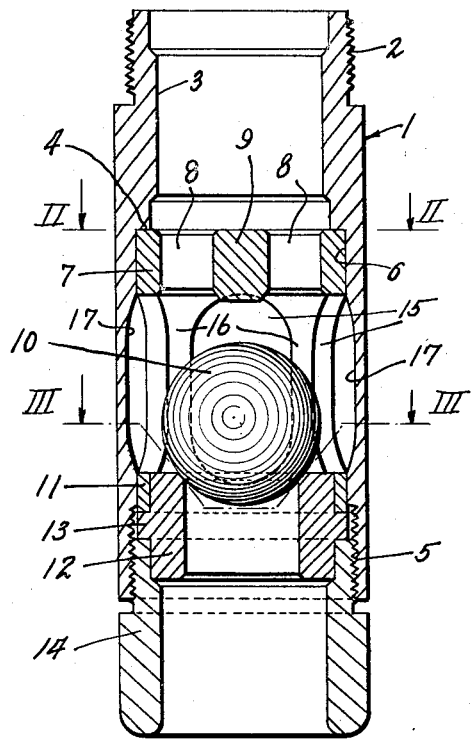
Fig. 4.
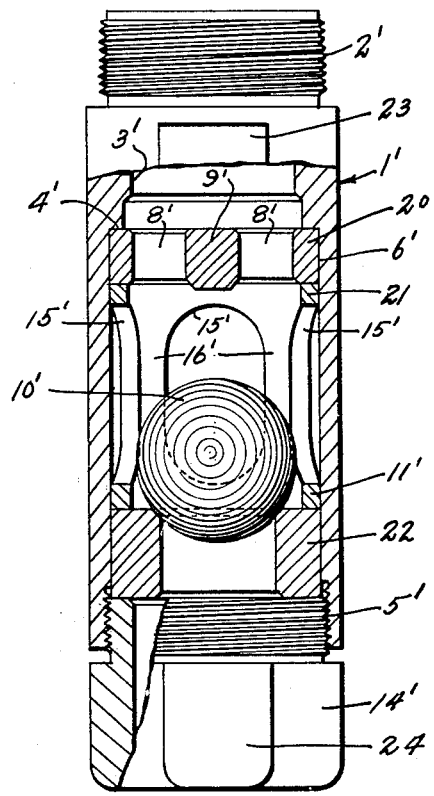
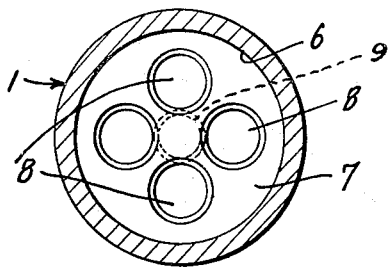
Fig. 2.
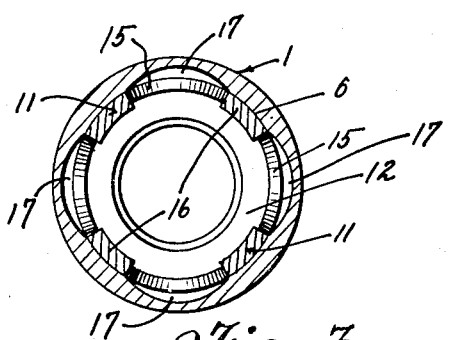
Fig. 3.
INVENTOR.
David M. Hammett
BY Lyon & Lyon
ATTORNEYS Patented June 29, 1937

2,085,360

UNITED STATES PATENT OFFICE 2,085,360

PUMP VALVE CONSTRUCTION

David M. Hammett, Tulsa, Okla., assignor to Axelson Manufacturing Company, Los Angeles, Calif., a corporation of California Application July 9, 1935, Serial No. 30,485

4 Claims. (Cl. 251—121)

This invention relates broadly to automatic or check valves for preventing the flow of fluid in one direction while permitting flow in the opposite direction and relates especially to valves of this type for use in pumps, particularly deep well pumps such as oil well pumps.

An object of the invention is to increase the efficiency and life of valves of the type referred to and at the same time reduce the cost of manufacturing and repairing them.

The manner in which this broad object is attained, together with other more specific objects and features of the invention, will be apparent from the following detailed description which refers to the drawing.

In the drawing:

Fig. 1 is a longitudinal sectional view of a valve in accordance with the invention;

Fig. 2 is a cross section taken in the plane II—II of Fig. 1;

Fig. 3 is a cross section taken in the plane III—III of Fig. 1 (with the valve ball or drop removed); and Fig. 4 is a longitudinal sectional view similar to Fig. 1 but showing a modified construction, portions of the valve being shown in elevation to better illustrate details of construction.

Referring to Fig. 1, I have shown therein a valve assembly adapted for use in a pump plunger. However, with obvious modifications, the same assembly may be employed for other purposes. Thus it may be employed as the standing valve in the lower end of a pump barrel. The assembly comprises a valve cage 1 consisting of a hollow cylindrical body reduced in external diameter at the upper end and provided with threads 2 for screwing into the lower end of a pump plunger or the lower end of another similar valve cage where two or more valves are employed.

The upper end of the cage is provided with a bore 3 of reduced diameter with respect to the bore 6 in the central and lower portion of the cage, the latter terminating at its upper end at an annular shoulder 4, the passage through the cage below the shoulder 4 being uniform in diameter and cylindrical in shape except at the extreme lower end where internal threads 5 are provided, these threads being of the same average diameter as the external threads 2 on the upper end of the device.

Positioned within the bore 6 and seating against the shoulder 4 is a valve guide 7 this guide being dimensioned to fit tightly within the bore 6 so that it must be pressed into place. The guide 7, as shown in Fig. 1, is machined from a single piece of metal and comprises a cup shaped element having an upper end portion constituting a closure member therefor. This upper end portion has drilled passages therethrough to permit flow of fluid, the passages 8 being symmetrically disposed about the center of the guide, as shown in Fig. 2, so that they leave in the center a solid block or mass of metal 9 which acts as a bumper for a valve ball 10 positioned within the guide 7. The lower end of the guide 7 comprises a ring portion 11 having a continuous cylindrical outer surface which forms a fluid tight seal with the surface of the bore 6 when the guide is pressed into position.

Positioned below the lower ring element 11 of the guide 7 is a valve seat 12 which as shown in Fig. 1, has a flange 13, the outside diameter of which is slightly less than the internal diameter of the threaded portion 5 of the case so that the seat may be readily inserted or removed from the cage.

The peripheral portions of the seat 12 above and below the flange 13 are of reduced dimensions to fit within the lower ring portion 11 of the guide 7 and the wall of a bushing 14, respectively. The upper face of the flange 13 seals against the lower face of the guide 7, the surfaces being ground to form a fluid tight joint when compressed together, and the bushing 14 bears against the under side of flange 13 and functions to clamp the seat firmly against the guide 7. If a second valve assembly is to be employed below the one shown in Fig. 1, then instead of employing the bushing 14 to clamp the seat 13 in place, the upper end portion of the second cage would perform this function.

The valve ball 10 is normally retained by gravity against the seat 12 and forms a fluid tight seal therewith, the upper edge of the seat being ground to fit the ball. However, if desired, a valve drop instead of the conventional ball 10 may be employed, the particular shape of the valve 10 not being relevant to the present invention.

The cylindrical wall of the valve guide 7 between its upper end and the lower end ring 11 has spaced apart longitudinal passages 15 cut therein, these passages extending completely through the wall of the guide and providing ample room for fluid to flow upwardly through the guide past the valve 10 when the latter has been lifted off its seat by fluid pressure therebelow. The material left between the passages 15 constitutes a plurality of vertical ribs 16 which guide the ball 10 in its vertical motion, the interior faces of the ribs 16 constituting portions of a cylindrical surface slightly larger in diameter than the ball 10 so that the latter is in no sense restricted against vertical movement. Upward movement of the valve 10 away from its seat is limited, however, by the end member 9. Although not essential it is desirable, in order to increase the total area of the fluid passages past the valve 10, to mill recesses 17 in the valve cage 1 at points juxtaposed to the openings 15 in the guide 7, these recesses being shown clearly in Fig. 1 and in the cross sectional view of Fig. 3.

The valve cage 1 is preferably made, in accordance with established practice, of a mild steel which is readily machined and has high tensile strength to reduce likelihood of breakage. The valve seat 12 and the valve guide 7, however, are preferably made of hardened steel to reduce wear due to friction with the valve 10 and the sand or other gritty material that may be present in the pumped fluid.

A great advantage of the construction described is that the guide 7 may be machined from a material capable of being subsequently hardened by heat treatment, then hardened and then ground to fit accurately within the bore 6 at relatively small expense as compared to the expense of hardening the wearing surfaces if the cage 1 and guide 7 were all made in one piece in accordance with established practice.

Another advantage of the construction is that the ribs 16 of the guide 7, which are of hardened material and are exposed to the impact of the valve 10, are backed up throughout their length by the soft tough material of the cage 1 against which they rest.

The separate guide 7 and cage 1 are also much easier to shape and mill than if they were constructed from a single piece of metal.

A further important advantage is that when the guide 7 has finally become worn to the point where it is no longer serviceable, it may be pressed out of the cage 1 and a new guide pressed in without replacing the cage 1, thereby saving considerable expense.

The construction described yields the foregoing advantages without involving even an additional threading operation since the threads 5 on the lower end of the cage 1 must always be provided to secure the seat 12 in place and the threads 2 on the upper end must also be provided in any event. The cage and guide assembly may also be employed with standard seats and ball valves.

Still another advantage of the construction is that if desired stainless steel may be employed as the material for the valve cage 1 and a more durable harder material employed for the valve guide 7.

Still another advantage is that any necessity for heat treating the cage 1 is avoided. The elimination of heat treatment is highly desirable because it often introduces distortion which would cause misalignment of the cage with the plunger on which it is used.

To simplify the operation of machining the lower face of the central member 9 against which the valve 10 impacts, a central boss is formed which projects below the main surface of the upper end portion of the guide 7. This permits machining or grinding of that portion of the under face of the member 9 which contacts the valve 10, without the removal of excessive amounts of metal from the surrounding portions of the face.

The valve construction illustrated in Fig. 4 is in general similar to that shown in Fig. 1 and corresponding portions bear the same reference numerals with the prime mark added. Thus it comprises a cage 1' threaded at 2' and 5' for the purposes described in connection with Fig. 1. The lower end of the cage 1' is closed by a bushing 14' exactly the same as in Fig. 1. A different guide and valve seat construction is shown in Fig. 4, however. Thus instead of the valve guide and ball bumper being formed integral, they are formed in two pieces, the ball bumper comprising a disk 20 having fluid apertures 8' therein and having a central body 9', the under face of which constitutes the bumper face for limiting upward movement of the valve 10'. The guide 21 is simply a tubular member open at both ends and seats against the disk 20 at the upper end. The guide 21 is pressed into the cage 1' so that the lower ring portion 11' thereof forms a fluid tight seal with the wall of the bore 6' of the cage 1'. The valve seat 22, instead of being flanged as shown in Fig. 1, is a plain tubular member, the upper face of which seats against the ring portion 11' of the guide 21 and forms a fluid tight seal therewith. The valve seat 22 is fitted loosely within the bore 6' and is maintained in position tightly against the guide 21 by the bushing 14' in exactly the same manner as is the valve seat shown in Fig. 1. The advantage of constructing the bumper plate 20 and the guide 21 in two pieces as disclosed in Fig. 1, is that it simplifies and reduces the cost of machining these parts.

To facilitate assembly of the device, the cage 1' is preferably provided with wrench flats 23, only one of which is shown in Fig. 4, and likewise the bushing 14' is provided with wrench flats 24, only one of which is shown in the figure. The cage 1 and bushing 14 in Fig. 1 may also be simultaneously provided with wrench flats to permit assembly and disassembly.

As shown in Fig. 4, the cage 1' has not been recessed opposite the openings 15' in the valve guide 21 since this recessing is optional and need not necessarily be done in all cases.

The invention has been described in detail with reference to two particular embodiments. It is to be understood, however, that other minor variations in the construction shown may be made without departing from the invention and the latter is therefore to be limited only as set forth in the appended claims.

I claim:

1. A valve assembly including in combination a valve cage comprising a cylindrical member having a passage therethrough, a lower portion of which passage is cylindrical, an annular shoulder on said member at the upper end of said cylindrical portion of said passage, a valve guide fitting tightly within said passage and seating against said shoulder, said guide comprising an annular portion at its lower end fitted tightly against and sealing with the wall of said passage to effect a fluid tight seal therewith, a valve seat fitted freely within said passage below said guide and seating against said annular portion of said guide, a bushing threaded into the lower end of said member and seating against said valve seat for pressing said valve seat against said guide and effecting a fluid tight seal therebetween, and a valve movable vertically within said guide to and from said valve seat, said guide comprising an upper ring portion joined by circumferentially spaced vertically extending rib portions to said lower, annular portion, the rib portions defining therebetween longitudinal fluid passages past said valve, the exterior surface of each rib portion being cylindrically curved to conform with the curvature of said passage whereby said ribs fit tightly against and are reinforced by the adjacent walls of said passage.

2. A valve assembly including in combination a valve cage comprising a cylindrical member having a passage therethrough, the lower portion of which passage is cylindrical, an annular shoulder on said member at the upper end of said cylindrical portion of said passage, a valve bumper plate comprising a disk fitting in the upper end of said passage against said shoulder, said disk having apertures therethrough for the passage of fluid, a valve guide fitting tightly within said passage and seating against the rim of said bumper plate, said guide comprising an annular portion at its lower end fitting tightly against the wall of said passage to effect a fluid tight seal therewith, a valve seat within said passage below said guide and seating against said guide, a bushing threaded into the lower end of said member and seating against said valve seat for pressing said valve seat against said guide and effecting a fluit tight seal therebetween, and a valve movable vertically within said guide to and from said valve seat.

3. A valve assembly including in combination, a valve cage comprising a cylindrical member having a passage therethrough, a lower portion of which passage is cylindrical, an annular shoulder in said member at the upper end of said cylindrical portion of said passage, valve guiding means fitting tightly within said passage and seating against said shoulder, said guiding means comprising an annular portion at its lower end fitted tightly against and sealing with the wall of said passage to effect a fluid tight seal therewith, a valve seat fitted freely within said passage below said guiding means and seating against said annular portion of said guiding means, a bushing threaded into the lower end of said member and seating against said valve seat for pressing said valve seat against said guiding means and effecting a fluid tight seal therebetween, and a valve movable vertically within said guiding means to and from said valve seat.

4. A valve assembly as described in claim 3, in which said cylindrical member is of soft relatively tough metal and said valve-guiding means is of harder metal to resist wear, said guiding means having side walls, substantially all portions of which are in contact with and reinforced by the said cylindrical member.

DAVID M. HAMMETT.